(12) United States Patent
Moore et al.

(10) Patent No.: US 10,583,611 B2
(45) Date of Patent: Mar. 10, 2020

(54) FIBER PLACEMENT SYSTEM AND METHOD WITH MODULATED LASER SCAN HEATING

(71) Applicant: The Boeing Company, Chicago, IL (US)

(72) Inventors: Stephen G. Moore, Renton, WA (US); Alexandra K. Dillon, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/002,536

(22) Filed: Jun. 7, 2018

(65) Prior Publication Data

US 2018/0290388 A1 Oct. 11, 2018

Related U.S. Application Data

(62) Division of application No. 14/711,133, filed on May 13, 2015.

(51) Int. Cl.
| | |
|---|---|
| *B29C 65/14* | (2006.01) |
| *G02B 26/10* | (2006.01) |
| *G02B 13/22* | (2006.01) |
| *B29C 65/00* | (2006.01) |
| *B29C 70/38* | (2006.01) |
| *B29K 101/12* | (2006.01) |
| *B29K 105/08* | (2006.01) |
| *B29L 9/00* | (2006.01) |

(52) U.S. Cl.
CPC ...... *B29C 65/1412* (2013.01); *B29C 66/8362* (2013.01); *B29C 66/952* (2013.01); *B29C 70/386* (2013.01); *G02B 13/22* (2013.01); *G02B 26/101* (2013.01); *G02B 26/105* (2013.01); *B29K 2101/12* (2013.01); *B29K 2105/0872* (2013.01); *B29L 2009/00* (2013.01)

(58) Field of Classification Search
CPC .............. B29C 65/1412; B29C 70/386; B29C 66/8362; B29C 66/952; G02B 26/101; G02B 26/105; G02B 13/22; B29K 2101/12; B29K 2105/0872; B29L 2009/00

See application file for complete search history.

(56) References Cited

U.S. PATENT DOCUMENTS

| | | | |
|---|---|---|---|
| 6,451,152 B1 * | 9/2002 | Holmes ................ | B23K 26/034 156/173 |
| 2006/0048881 A1 * | 3/2006 | Evans ................. | B29C 65/1632 156/64 |
| 2010/0009171 A1 * | 1/2010 | Greb ................... | B29C 65/1677 428/328 |
| 2011/0240218 A1 * | 10/2011 | Nelson .................... | B29C 70/38 156/272.2 |

FOREIGN PATENT DOCUMENTS

WO   WO-2011097453 A1 *   8/2011   .............. B41M 5/24

* cited by examiner

*Primary Examiner* — Vishal I Patel
(74) *Attorney, Agent, or Firm* — Walters & Wasylyna LLC

(57) ABSTRACT

A fiber placement system including a compaction roller rotatable about an axis of rotation, the compaction roller at least partially defining a compaction nip region, and a laser heating assembly including a laser that emits a beam of electromagnetic radiation and a scan head defining a scan field, the scan field being aligned with the compaction nip region, wherein the scan head scans the beam within the scan field.

20 Claims, 6 Drawing Sheets

FIBER PLACEMENT SYSTEM AND METHOD WITH MODULATED LASER SCAN HEATING

PRIORITY

This application is a divisional of U.S. Ser. No. 14/711,133 filed on May 13, 2015.

FIELD

This application relates to fiber placement and, more particularly, to laser-assisted fiber placement.

BACKGROUND

Composite structures are commonly used as high-strength, low-weight materials and, therefore, find various applications in the aerospace and automotive industries. A composite structure includes one or more composite layers, wherein each composite layer includes a reinforcement material and a matrix material. The reinforcement material may include fibers. The matrix material may be a polymeric material, such as a thermosetting resin or a thermoplastic resin.

Fiber-reinforced composite structures may be manufactured by laying up multiple layers of fiber tow to form a reinforcement layup. The fiber tow generally includes a bundle of fibers (reinforcement material) impregnated with a matrix material. In fiber placement technologies, the fiber tow is generally supplied in strip/tape form from a bulk reel and is pressed onto the underlying layup at a compaction nip using a compaction roller. The fully assembled reinforcement layup is then cured and/or consolidated, as necessary, to from the composite structure.

When the matrix material of the fiber tow is a thermoplastic resin, the layup process typically requires heating to soften the thermoplastic resin and obtain layer-to-layer consolidation within the reinforcement layup. Typically, a laser beam (e.g., an infrared laser beam) is projected toward the compaction nip to heat the fiber tow and/or the underlying layup during fiber placement. However, laser heating can be difficult to control, resulting in overheating of the fiber tow and/or the underlying layup.

Accordingly, those skilled in the art continue with research and development efforts in the field of laser-assisted fiber placement.

SUMMARY

In an embodiment, disclosed is a method for placing a composite ply on a substrate. The method may include steps of (1) positioning a compaction roller against the substrate to define a nip therebetween; (2) scanning a beam of electromagnetic radiation proximate the nip; and (3) passing the composite ply through the nip.

Other embodiments of the disclosed fiber placement system and method with modulated laser scan heating will become apparent from the following detailed description, the accompanying drawings and the appended claims.

DETAILED DESCRIPTION

Figure 1:
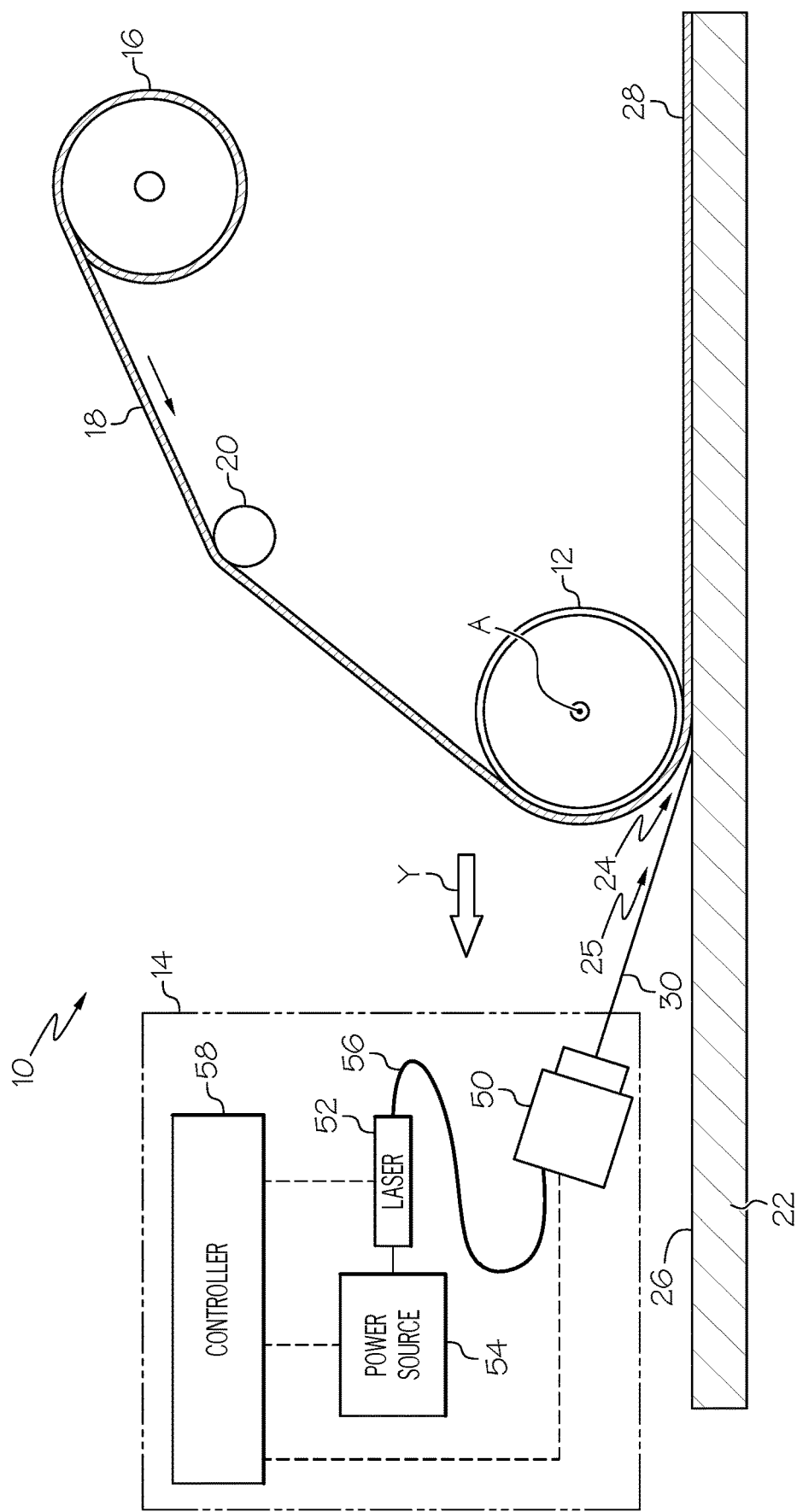
FIG. 1 is a schematic side elevational view of one embodiment of the disclosed fiber placement system.

Referring to FIG. 1, one embodiment of the disclosed fiber placement system, generally designated 10, may include a compaction roller 12, a laser heating assembly 14, and a bulk reel 16 of composite ply 18. Without departing from the scope of the present disclosure, the fiber placement system 10 may include various additional components, such as one or more guide rollers 20 for guiding the composite ply 18 from the bulk reel 16 to the compaction roller 12 and/or a drive mechanism for urging the compaction roller 12 and the laser heating assembly 14 in the direction shown by arrow Y.

At this point, those skilled in the art will appreciate that the disclosed fiber placement system 10 may be associated with an Automated Fiber Placement (AFP) machine. For example, the compaction roller 12 and the laser heating assembly 14 of the fiber placement system 10 may be at least partially housed within the application head of an Automated Fiber Placement machine. The application head of the Automated Fiber Placement machine may be moveable, such as by way of a robotic arm.

The composition of the composite ply 18 supplied from the bulk reel 16 of the disclosed fiber placement system 10 may vary depending on need/application. In one realization, the composite ply 18 may be a fiber-reinforced material that includes a reinforcement material and a matrix material. The reinforcement material may be (or may include) fibers, such as carbon fibers. The fibers may be oriented in a single direction (e.g., uni-directional) or in two or more directions (e.g., bi-directional). The matrix material may be (or may include) a polymeric matrix material, such as a thermoplastic resin or, alternatively, a thermosetting resin. In another realization, the composite ply 18 may be unreinforced (e.g., a resin-only material).

As one specific, non-limiting example, the composite ply 18 may be a thermoplastic tow (or slit tape). The thermoplastic tow may include a reinforcement material (e.g., carbon fiber) and a thermoplastic polymer matrix material. Specific examples of thermoplastic polymers that may be used to form a thermoplastic tow suitable for use as the composite ply 18 include, without limitation, polyether ether ketone (PEEK), polyether ketone (PEKK), polyphenaline sulfide (PPS), polyethylene, polypropylene, and polystyrene.

The compaction roller 12 of the disclosed fiber placement system 10 may be rotatable about an axis of rotation A (perpendicular to the page in FIG. 1), and may be positioned against a substrate 22 to define a nip 24 between the compaction roller 12 and the surface 26 of the substrate 22. The substrate 22 may be any structure or arrangement of material capable of receiving the composite ply 18 on the surface 26 thereof. As one example, the substrate 22 may be a reinforcement layup that includes one or more previously-applied layers of the composite ply 18. As another example, the substrate 22 may be a composite backing material, such as a backing cloth.

The composite ply 18 may be unwound from the bulk reel 16, may pass over the guide roller 20, may extend over the compaction roller 12 and, ultimately, may pass through the nip 24. As the composite ply 18 passes through the nip 24, the compaction roller 12 may urge the composite ply 18 against the surface 26 of the substrate 22. Furthermore, as the compaction roller 12 moves relative to the substrate 22 (e.g., in the direction shown by arrow Y), a composite layer 28 may be formed over the surface 26 of the substrate 22. Multiple layers (similar to composite layer 28) may be applied to the substrate 22 in such a manner.

The laser heating assembly 14 of the disclosed fiber placement system 10 may be positioned to project a beam 30 of electromagnetic radiation into the compaction nip region 25 proximate (at or near) the nip 24 between the compaction roller 12 and the substrate 22. Therefore, the beam 30 may heat a portion of the composite ply 18 and/or a portion of the substrate 22 just prior to, or simultaneously with, those portions of the composite ply 18 and the substrate 22 passing through the nip 24. When the composite ply 18 and/or the substrate 22 includes a thermoplastic material, the heat from the laser heating assembly 14 may soften the thermoplastic material, thereby rendering it tacky and facilitating consolidation between the composite ply 18 and the substrate 22.

The beam 30 of electromagnetic radiation emitted by the laser heating assembly 14 has a wavelength. The wavelength of the beam 30 may be a design consideration. In one expression, the beam 30 may have a wavelength ranging from about 0.75 μm to about 1.4 μm (near-infrared (NIR)). In another expression, the beam 30 may have a wavelength ranging from about 1.4 μm to about 3 μm (short-wavelength infrared (SWIR)). In another expression, the beam 30 may have a wavelength ranging from about 3 μm to about 8 μm (mid-wavelength infrared (MWIR)). In another expression, the beam 30 may have a wavelength ranging from about 8 μm to about 15 μm (long-wavelength infrared (LWIR)). In yet another expression, the beam 30 may have a wavelength ranging from about 15 μm to about 1,000 μm (far-infrared (FIR)).

Still referring to FIG. 1, the laser heating assembly 14 may include a scan head 50, a laser 52, a power source 54, an optical fiber 56, and a controller 58. The laser heating assembly 14 may include additional components, such as additional electronic components, additional optical components and/or additional structural components, without departing from the scope of the present disclosure.

The scan head 50 of the laser heating assembly 14 may be positioned relative to the compaction roller 12 and the substrate 22 to project the beam 30 proximate the compaction roller 12 and, more specifically, into the compaction nip region 25 proximate the nip 24 between the compaction roller 12 and the substrate 22. In one expression, the scan head 50 may be spaced about 3 inches to about 36 inches from the nip 24. In another expression, the scan head 50 may be spaced about 4 inches to about 24 inches from the nip 24. In yet another expression, the scan head 50 may be spaced about 6 inches to about 12 inches from the nip 24.

Figure 2:
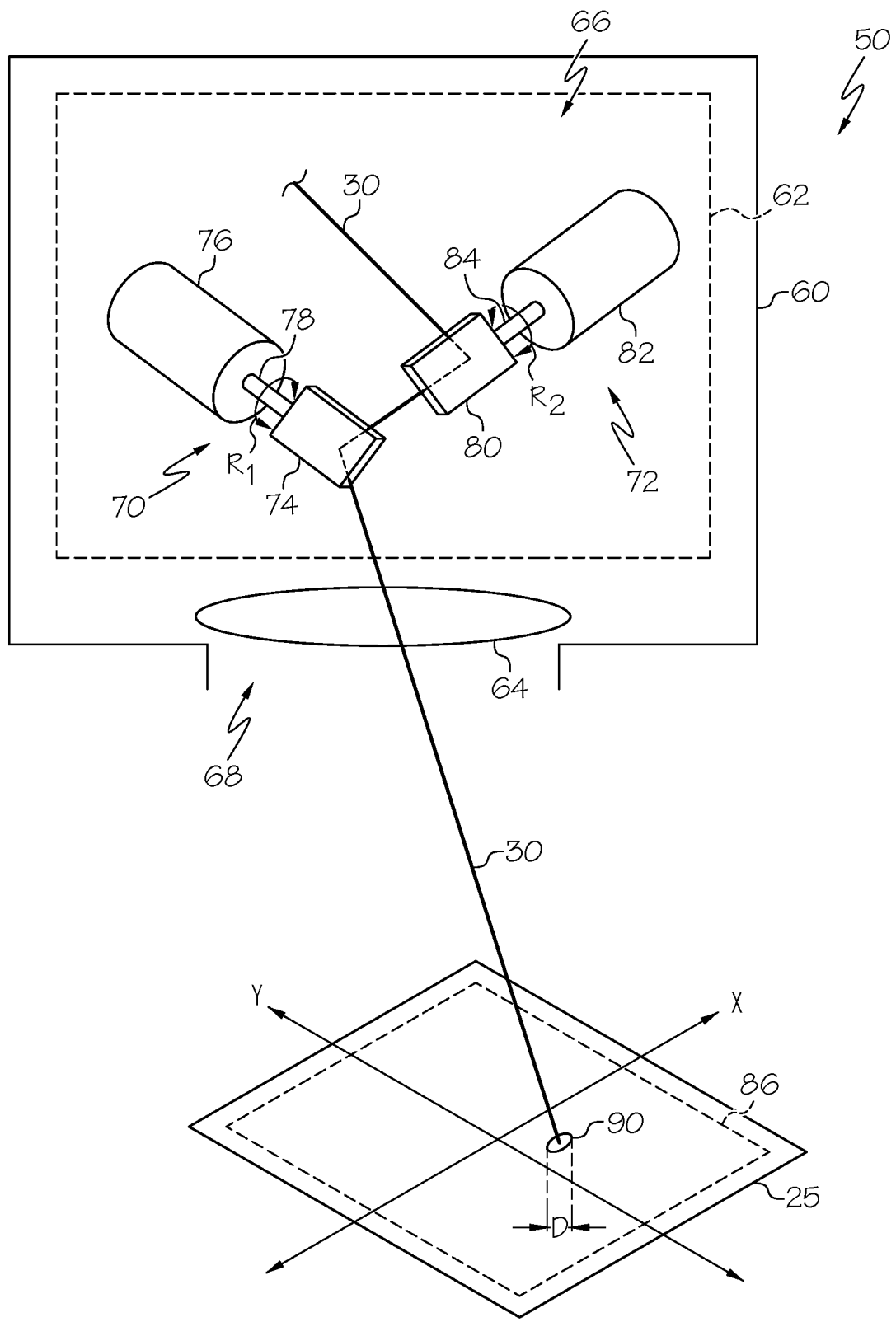
FIG. 2 is a schematic representation of the scan head of the laser heating assembly of the fiber placement system of FIG. 1.

Referring to FIG. 2, the scan head 50 may include a housing 60, a galvo assembly 62, and an optical element 64. The housing 60 may define an internal volume 66 and an opening 68 into the internal volume 66. The galvo assembly 62 may be positioned in the internal volume 66 of the housing 60. The optical element 64 may be positioned at least partially within the housing 60, and may be aligned with the opening 68 in the housing 60.

The galvo assembly 62 of the scan head 50 may include an x-axis galvanometer device 70 and a y-axis galvanometer device 72. The x-axis galvanometer device 70 may include a first mirror 74 connected to a first motor 76 by a first shaft 78. The first motor 76 may rotate the first shaft 78 and, thus, the first mirror 74 about a first axis of rotation $R_1$. Likewise, the y-axis galvanometer device 72 may include a second mirror 80 connected to a second motor 82 by a second shaft 84. The second motor 82 may rotate the second shaft 84 and, thus, the second mirror 80 about a second axis of rotation $R_2$.

While the galvo assembly 62 of the scan head 50 is shown and described having both x-axis and y-axis galvanometer devices 70, 72, using a galvo assembly 62 with only one galvanometer device will not result in a departure from the scope of the present disclosure. Furthermore, using a galvo assembly 62 with more than two galvanometer devices will not result in a departure from the scope of the present disclosure.

The scan head 50 may be optically coupled with the laser 52 by way of the optical fiber 56, as shown in FIG. 1. Therefore, as shown in FIG. 2, the scan head 50 may receive the beam 30 emitted by the laser 52, and may direct the beam 30 to the galvo assembly 62. The galvo assembly 62 may facilitate scanning of the beam 30 in the manner dictated by the controller 58 (FIG. 1). Specifically, the mirror 80 of the y-axis galvanometer device 72 may receive the incoming beam 30 and, with controlled rotation about the second axis of rotation $R_2$, the mirror 80 may scan the beam 30 along the y-axis. The mirror 74 of the x-axis galvanometer device 70 may receive the beam 30 reflected by the y-axis galvanometer device 72 and, with controlled rotation about the first axis of rotation $R_1$, the mirror 74 may scan the beam 30 along the x-axis.

Thus, the galvo assembly 62 may define a two-dimensional scan field 86. When the galvo assembly 62 includes an x-axis galvanometer device 70 and a y-axis galvanometer device 72, the scan field 86 may extend in both the x-axis direction (the lateral direction) and the y-axis direction (the machine direction), as shown in FIG. 2.

As shown in FIG. 1, the controller 58 may be in communication with the scan head 50. The controller 58 may be any apparatus or system (e.g., a microprocessor) capable is generating and communicating command signals to achieve a desired result from a controlled device (e.g., the galvo assembly 62, the power source 54, the laser 52). The command signals may be based on instructions (e.g., inputs from a user) and/or feedback signals. Therefore, referring back to FIG. 2, the controller 58 (FIG. 1) may be in communication with the galvo assembly 62 of the scan head 50 to provide motion commands to the motors 76, 82 driving the mirrors 74, 80 of the galvanometer devices 70, 72 of the galvo assembly 62.

As shown in FIG. 1, and with reference to FIG. 2, the scan head 50 may be oriented relative to the compaction roller 12 and the substrate 22 such that the scan field 86 defined by the galvo assembly 62 is aligned with (e.g., superimposed over) the compaction nip region 25 proximate the nip 24 between the compaction roller 12 and the substrate 22. Therefore, by controlling the galvo assembly 62 (e.g., by controlling the orientations of the mirrors 74, 80 by way of the associated motors 76, 82), the controller 58 may project the beam 30 at any desired location within the compaction nip region 25.

With robust control of the mirrors 74, 80, the controller 58 may effect high speed scanning of the beam 30 within the compaction nip region 25.

Thus, the scan head 50 may facilitate scanning (e.g., rastering) of the beam 30 within the compaction nip region 25 in both the x-axis direction and the y-axis direction. As such, a single scan head 50 may heat the entire compaction nip region 25 without the need for an array of lasers and/or an articulation device that articulates a laser to effect movement of the associated beam.

Referring again to FIG. 2, the optical element 64 of the scan head 50 may be positioned to receive the beam 30 leaving the galvo assembly 62. The optical element 64 may manipulate the beam 30 received from the galvo assembly 62 and may direct the beam 30 into the compaction nip region 25.

The optical element 64 may be (or may include) a lens, such as an objective lens. The beam 30 received by the scan head 50 from the optical fiber 56 may be a diverging beam. Therefore, when the optical element 64 is/includes a lens, the beam 30 may be focused into a spot 90 having the desired maximum transverse dimension D (e.g., diameter). In one expression, the maximum transverse dimension D of the spot 90 formed by the beam 30 may range from about 0.001 inch to about 1 inch. In another expression, the maximum transverse dimension D of the spot 90 formed by the beam 30 may range from about 0.01 inch to about 0.1 inch. As one specific, non-limiting example, the spot 90 formed by the beam 30 may have a diameter D of about 0.05 inch.

In one particular construction, the optical element 64 may be (or may include) a telecentric lens. Those skilled in the art will appreciate that using a telecentric lens as (or in) the optical element 64 may yield a spot 90 having a maximum transverse dimension D that does not substantially vary within the scan field 86 as a function of distance from the scan head 50. Therefore, the spot 90 may be substantially uniform, even as the spot 90 is moved throughout the scan field 86.

Referring back to FIG. 1, the controller 58 may control one or more parameters of the beam 30 that is supplied by the laser 52 and, ultimately, projected into the compaction nip region 25. In one implementation, the controller 58 may control the optical power of the beam 30. In another implementation, the controller 58 may control the pulse frequency of the beam 30. In yet another implementation, the controller 58 may control both the optical power of the beam 30 and the pulse frequency of the beam 30. Controlling other beam parameters (e.g., duty cycle) with the controller 58 is also contemplated.

The laser 52 of the laser heating assembly 14 may be electrically coupled with the power source 54. For example, the power source 54 may be a source of alternating electric current. The laser 52 may generate the beam 30 when it is powered by the power source 54. The beam 30 may have an optical power, and the optical power may be a function of the electrical power supplied by the power source 54. For example, when the laser 52 is supplied 500 watts, the laser 52 may emit a beam 30 having full optical power. However, as the supplied power is reduced, the optical power is reduced a corresponding amount (a percentage of full power).

The controller 58 of the laser heating assembly 14 may be in communication with the power source 54. Therefore, the controller 58 may control the amount of electrical energy supplied to the laser 52 and, thus, the optical power of the beam 30 emitted by the laser 52, by controlling the power source 54.

The controller 58 of the laser heating assembly 14 also may be in communication with the laser 52 to control actuation of the laser 52 and/or the pulse frequency of the beam 30 emitted by the laser 52. In one implementation, the laser 52 may be a continuous wave (CW) laser, and the controller 58 may modulate the beam 30 emitted by the laser 52 to achieve the desired pulse frequency. In another implementation, the laser 52 may be a pulsed laser, and may emit a beam 30 having the desired pulse frequency.

The pulse frequency of the beam 30 may be based on, among other possible factors, the speed at which the galvo assembly 62 (FIG. 2) of the scan head 50 scans the beam 30. In one expression, the pulse frequency of the beam 30 may range from about 0 (continuous beam, no pulse) to 10 kHz. In another expression, the pulse frequency of the beam 30 may range from about 1 kHz to about 10 kHz. In another expression, the pulse frequency of the beam 30 may range from about 2 kHz to about 8 kHz. In another expression, the pulse frequency of the beam 30 may range from about 3 kHz to about 6 kHz. In yet another expression, the pulse frequency of the beam 30 may range from about 1 kHz to about 5 kHz.

Accordingly, the laser heating assembly 14 of the disclosed fiber placement system 10 may scan a beam 30 within a scan field 86 aligned with the compaction nip region 25 proximate the nip 24 between the compaction roller 12 and the substrate 22, while controlling the optical power of the beam 30 and/or the pulse frequency of the beam 30. Other parameters of the beam 30 (e.g., duty cycle) may also be controlled while the beam 30 is scanned within the scan field 86. Therefore, the laser heating assembly 14 may be used to obtain various heating profiles within the compaction nip region 25.

Figure 3:
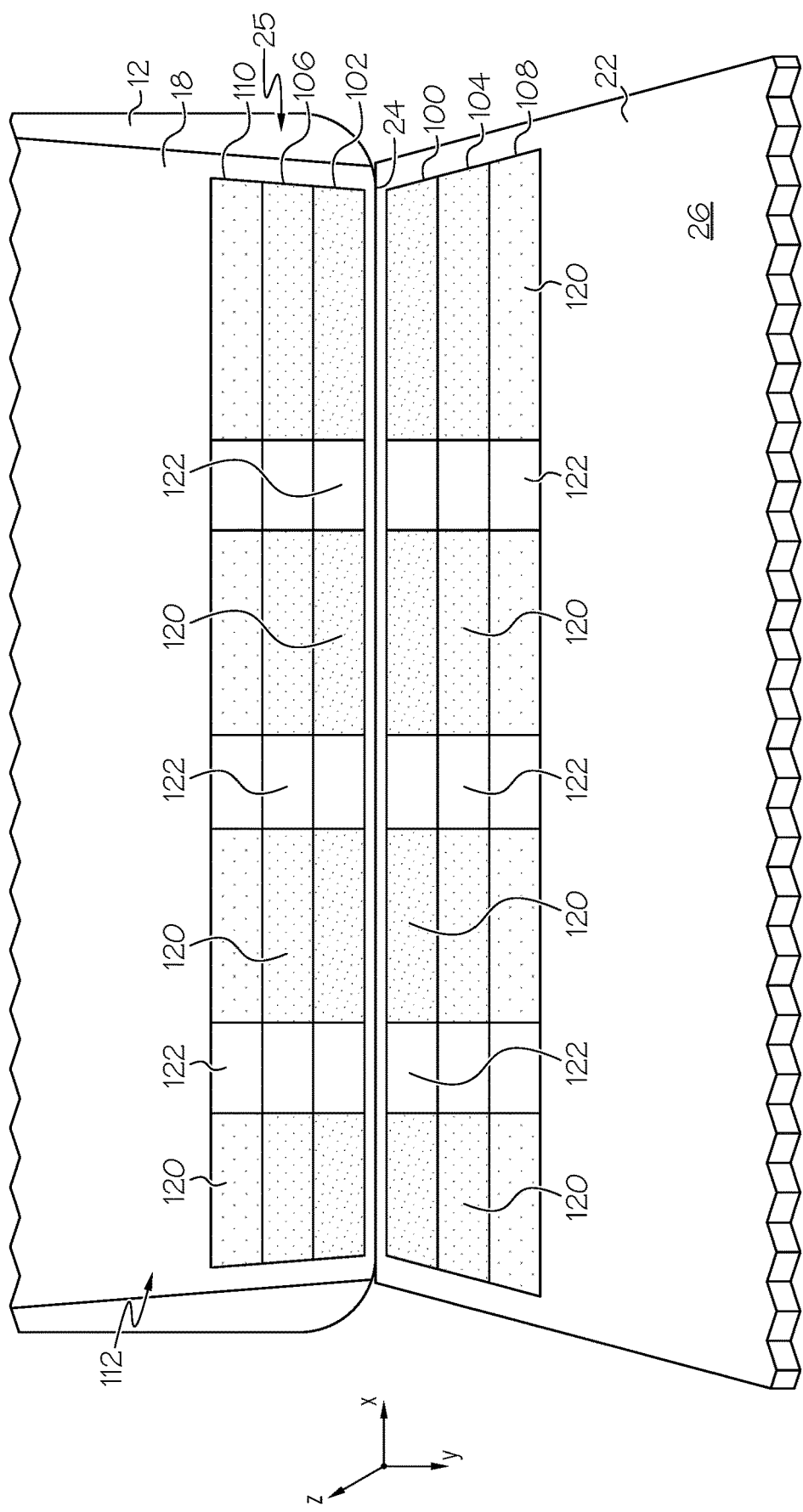
FIG. 3 is a machine (y-axis) directional view of the compaction nip region of the fiber placement system of FIG. 1.

FIG. 3 illustrates an example heating profile that may be obtained on the composite ply 18 and the substrate 22 using the laser heating assembly 14 of the disclosed fiber placement system 10. In the specific, non-limiting example of FIG. 3, the beam 30 (FIGS. 1 and 2) may be scanned by the laser heating assembly 14 to yield multiple scan rows 100, 102, 104, 106, 108, 110. Each scan row 100, 102, 104, 106, 108, 110 may laterally extend (x-axis) across the scan field 86 (FIG. 2) to produce a column 112 of scan rows 100, 102, 104, 106, 108, 110 that extends in the machine (y-axis) direction along the scan field 86. Scan rows 100, 104, 108 may be formed on the surface 26 of the substrate 22 within the compaction nip region 25, while scan rows 102, 106, 110 may be formed on the composite ply 18 within the compaction nip region 25.

By controlling the optical power of the beam 30 (FIGS. 1 and 2), the amount of heating from scan row 100, 102, 104, 106, 108, 110 to scan row 100, 102, 104, 106, 108, 110 may be varied. As shown in FIG. 3 with varying stippling density, scan rows 100, 102, which may be closest to the nip 24, may be formed using a beam 30 having greater optical power than the beam 30 used to form scan rows 104, 106, 108, 110, while scan rows 104, 106 may be formed using a beam 30 having greater optical power than the beam 30 used to form scan rows 108, 110. Therefore, greater heating may be applied to the portions of the composite ply 18 and the substrate 22 about to be compacted in the nip 24 (see scan rows 100, 102), while the adjacent portions may be gradually preheated (see scan rows 104, 106, 108, 110).

Furthermore, by controlling the pulse frequency of the beam 30 (FIGS. 1 and 2) to achieve a non-zero pulse frequency, heat zones 120 and dead zones 122 may be established within the scan rows 100, 102, 104, 106, 108, 110. The heat zones 120 correspond to portions of the scan rows 100, 102, 104, 106, 108, 110 that received electromagnetic radiation (the on-cycle of the pulse), while the dead zones 122 correspond to portions of the scan rows 100, 102, 104, 106, 108, 110 that did not receive electromagnetic radiation (the off-cycle of the pulse).

Figure 4A:
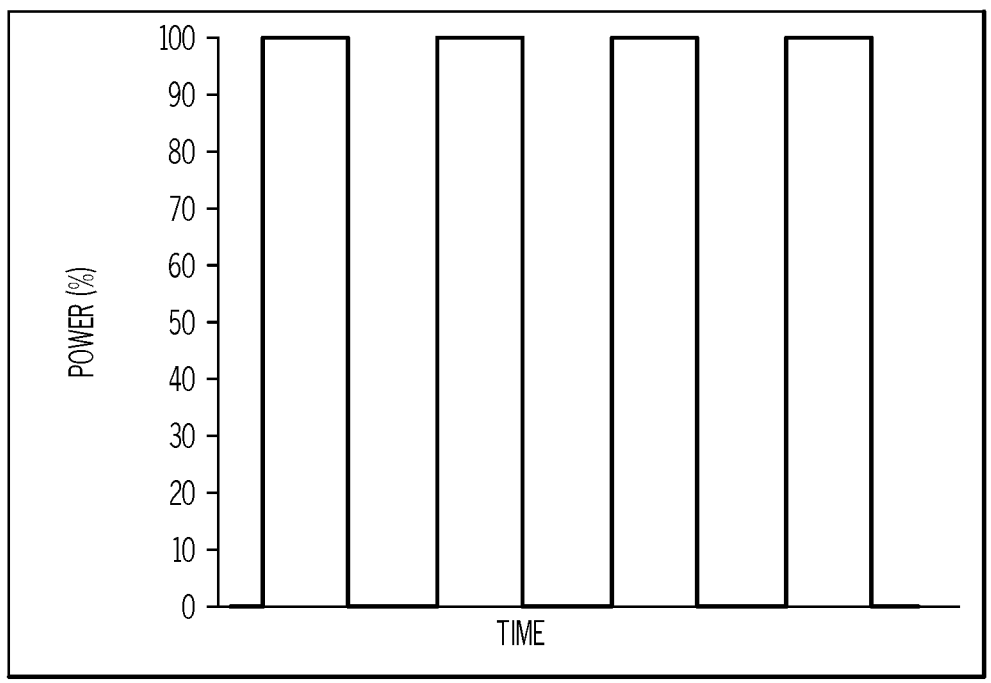
FIGS. 4A-4C are graphical representations of beam power versus time for the laser heating assembly of the fiber placement system of FIG. 1.
Figure 4B:
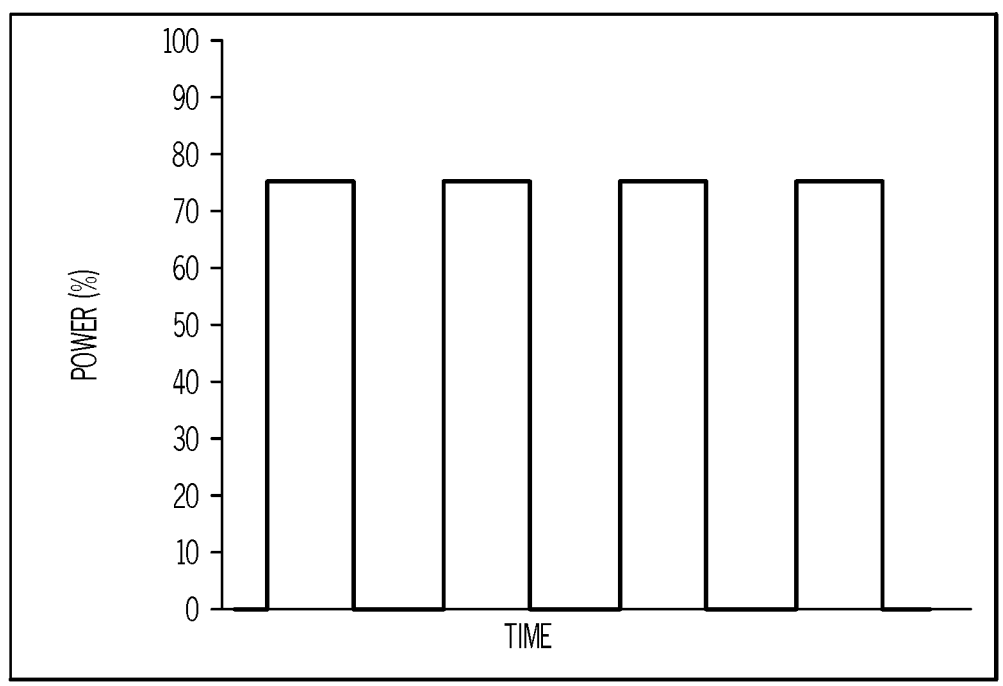
Figure 4C:
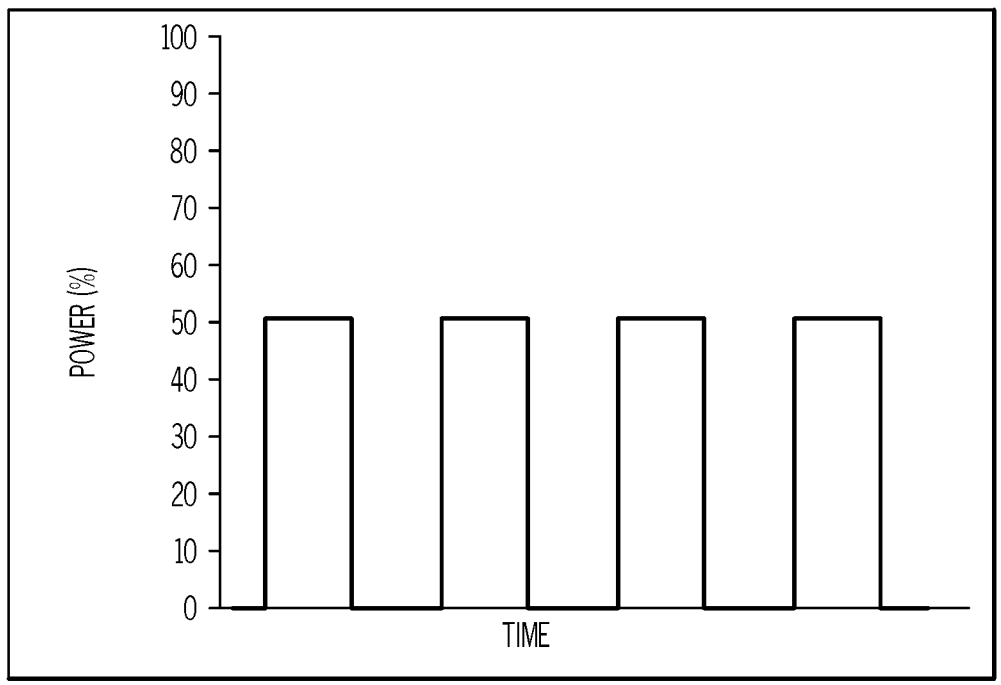

Thus, the waveform shown in FIG. 4A represents the beam 30 (FIGS. 1 and 2) that produced scan rows 100, 102, while the waveform shown in FIG. 4B represents the beam 30 that produced scan rows 104, 106 and the waveform shown in FIG. 4C represents the beam 30 that produced scan rows 108, 110. At this point, those skilled in the art will appreciate that variations in the heating profile may be obtained by altering the scan speed, the optical power of the beam 30 and/or the pulse frequency of the beam 30.

Figure 5:
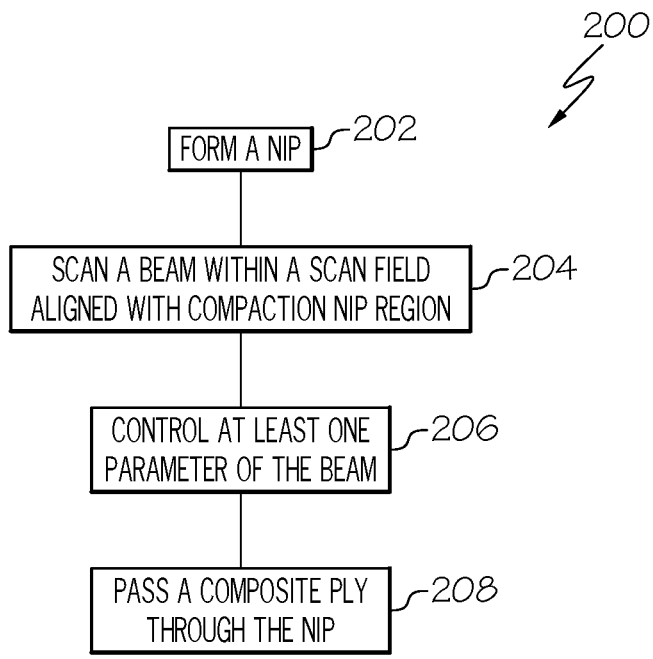
FIG. 5 is a flow diagram depicting one embodiment of the disclosed fiber placement method.

Also disclosed is a fiber placement method, which may be used to place a composite ply on a substrate. Referring to FIG. 5, with additional reference to FIGS. 1 and 2, one embodiment of the disclosed fiber placement method, generally designated 200, may begin at Block 202 with the step of positioning a compaction roller 12 against a substrate 22 to form a nip 24 between the compaction roller 12 and the substrate 22.

At Block 204, a beam 30 of electromagnetic radiation may be scanned proximate the nip 24. The beam 30 may be scanned within a scan field 86, and the scan field 86 may be aligned with (e.g., superimposed over) a compaction nip region 25 proximate the nip 24 between the compaction roller 12 and the substrate 22. For example, the beam 30 may be rastered across the scan field 86.

At Block 206, at least one parameter of the beam 30 may be controlled. In one implementation, the optical power of the beam 30 may be controlled. In another implementation, the pulse frequency of the beam 30 may be controlled. In yet another implementation, the both the optical power of the beam 30 and the pulse frequency of the beam 30 may be controlled.

At Block 208, a composite ply 18 (e.g., a thermoplastic tow) may be passed through the nip 24 between the compaction roller 12 and the substrate 22. Therefore, the composite ply 18 and/or the substrate 22 may be heated by the beam 30 of electromagnetic radiation as it passes through the nip 24.

Thus, the disclosed fiber placement method 200 may facilitate controlled radiative heating of a composite ply 18 as the composite ply 18 passes through a nip 24. Specifically, by scanning the beam 30 while controlling optical power of the beam and/or pulse frequency of the beam 30, the risk of overheating the composite ply 18 and the substrate 22 may be significantly reduced (if not eliminated).

Figure 6:
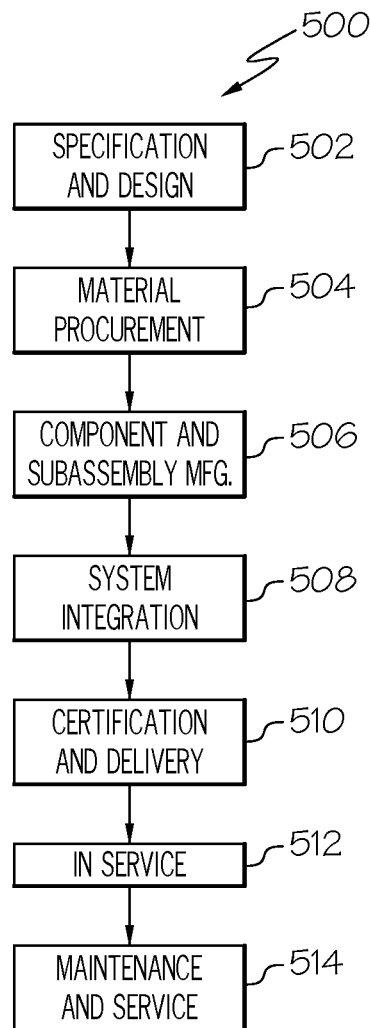
FIG. 6 is a flow diagram of an aircraft manufacturing and service methodology.
Figure 7:
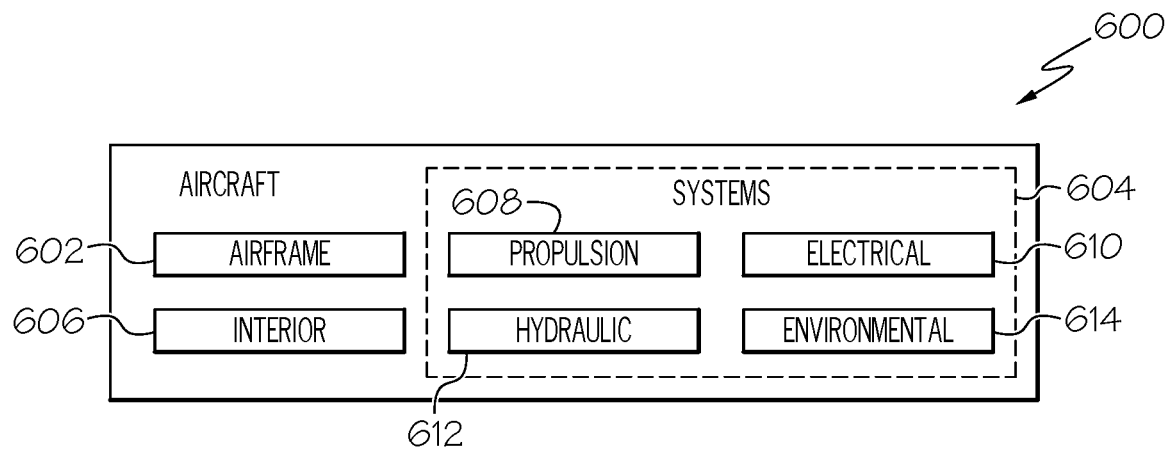
FIG. 7 is a block diagram of an aircraft.

Examples of the present disclosure may be described in the context of an aircraft manufacturing and service method 500 as shown in FIG. 6 and an aircraft 600 as shown in FIG. 7. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place. Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc. of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, the aircraft 600 produced by illustrative method 500 (FIG. 6) may include airframe 602 with a plurality of high-level systems 604 and interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed fiber placement system and method with modulated laser scan heating may be employed during any one or more of the stages of the manufacturing and service method 500. For example, components or subassemblies corresponding to component and subassembly manufacturing (block 506) may be fabricated or manufactured using the disclosed fiber placement system and method with modulated laser scan heating. Also, the disclosed fiber placement system and method with modulated laser scan heating may be utilized during production stages (blocks 506 and 508), for example, by substantially expediting assembly of or reducing the cost of aircraft 600. Similarly, the disclosed fiber placement system and method with modulated laser scan heating may be utilized, for example and without limitation, while aircraft 600 is in service (block 512) and/or during the maintenance and service stage (block 514).

Although various embodiments of the disclosed fiber placement system and method with modulated laser scan heating have been shown and described, modifications may occur to those skilled in the art upon reading the specification. The present application includes such modifications and is limited only by the scope of the claims.

What is claimed is:

1. A method for placing a composite ply on a substrate comprising:
    positioning a compaction roller against said substrate to define a nip therebetween;
    scanning a beam of electromagnetic radiation proximate said nip, said beam comprising an optical power, a pulse frequency and a scan speed;
    while said beam is being scanned, varying at least one of said optical power of said beam, said pulse frequency of said beam and said scan speed of said beam to obtain a desired heating profile proximate said nip; and
    passing said composite ply through said nip.

2. The method of claim 1 wherein said pulse frequency ranges from about 1 kHz to about 10 kHz.

3. The method of claim 1 wherein said pulse frequency ranges from about 3 kHz to about 6 kHz.

4. The method of claim 1 wherein said heating profile comprises greater heating applied to scan rows closest to said nip than to scan rows further from said nip.

5. The method of claim 1 wherein said scanning of said beam comprises sending said beam through a galvo assembly.

6. The method of claim 1 wherein said beam has a wavelength ranging from about 0.75 μm to about 1.4 μm.

7. The method of claim 1 wherein said composite ply comprises a reinforcement material and a thermoplastic polymer.

8. The method of claim 1 wherein said scanning said beam comprises rastering said beam.

9. The method of claim 1 wherein said scanning said beam comprises scanning said beam in a scan row extending across a scan field.

10. The method of claim 9 wherein said scan row comprises at least one heat zone and at least one dead zone.

11. The method of claim 9 wherein said scan field extends in an x-axis direction and a y-axis direction, and wherein said scanning said beam comprises varying a location of said beam along said x-axis direction and said y-axis direction.

12. The method of claim 1 further comprising focusing said beam into a spot.

13. The method of claim 12 wherein said scanning said beam comprises moving said spot within a scan field.

14. The method of claim 12 wherein said spot has a maximum transverse dimension ranging from about 0.001 inch to about 1 inch.

15. The method of claim 12 wherein said spot has a maximum transverse dimension ranging from about 0.01 inch to about 0.1 inch.

16. The method of claim 1 further comprising rotating said compaction roller about an axis of rotation.

17. The method of claim 1 wherein said scanning of said beam further comprises sending said beam through an optical element.

18. The method of claim 17 wherein said optical element comprises a lens.

19. The method of claim 5 wherein said galvo assembly is housed within a scan head, and said method further comprises spacing said scan head about 3 inches to about 36 inches away from said nip.

20. The method of claim 19 further comprising optically coupling said scan head with a laser using an optical fiber.

* * * * *